United States Patent [19]

Morimitsu et al.

[11] Patent Number: 4,841,033
[45] Date of Patent: Jun. 20, 1989

[54] REACTIVE RED MONOAZO DYE COMPOUND HAVING TWO VINYLSULFONE TYPE FIBER REACTIVE GROUPS

[75] Inventors: Toshihiko Morimitsu; Sadanobu Kikkawa, both of Minoo; Naoki Harada, Suita; Takashi Omura, Ashiya, all of Japan

[73] Assignee: Sumitomo Chemical Company, Limited, Osaka, Japan

[21] Appl. No.: 102,355

[22] Filed: Sep. 29, 1987

[30] Foreign Application Priority Data

Oct. 29, 1986 [JP] Japan ............... 61-257841
Dec. 9, 1986 [JP] Japan ............... 61-294513

[51] Int. Cl.$^4$ .................. C09B 62/51; D06P 1/384; D06P 3/66
[52] U.S. Cl. .................. 534/642; 534/582; 534/598; 534/638
[58] Field of Search ............... 534/642, 803

[56] References Cited

U.S. PATENT DOCUMENTS 3,223,470 12/1965 Boedeker et al. ......... 536/638 X

FOREIGN PATENT DOCUMENTS 0076782 4/1983 European Pat. Off. ......... 534/642
0238894 9/1987 European Pat. Off. ......... 534/642
1350612 12/1963 France ......... 534/642

OTHER PUBLICATIONS

Kagaku To Kougyou (Science and Industry), vol. 42, No. 11, pp. 583-594.

*Primary Examiner*—Floyd D. Higel
*Attorney, Agent, or Firm*—Stevens, Davis, Miller & Mosher

[57] ABSTRACT

A monoazo compound of the following formula in a free acid form,

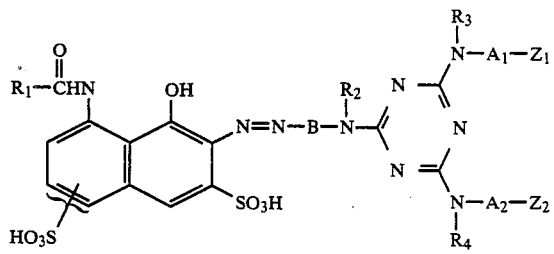

wherein $R_1$ is alkyl, $\beta$-carboxyethyl, $\beta$-carboxyvinyl or phenyl, $R_2$, $R_3$ and $R_4$ are each hydrogen or alkyl, $A_1$ and $A_2$ are each phenylene or naphthylene, B is

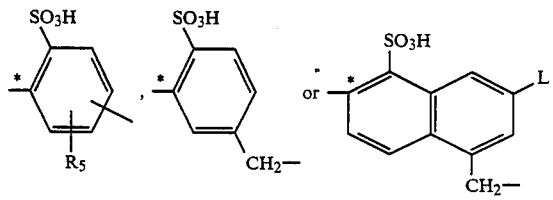

in which $R_5$ is hydrogen, methyl or sulfo, L is hydrogen or sulfo, and the asterisked linkage is bonded to the azo group, and $Z_1$ and $Z_2$ are each $-SO_2CH=CH_2$, $-SO_2CH_2CH_2OSO_3H$ or the like, which is useful for dyeing or printing fiber materials to give dyed or printed products of extremely deep red color excellent in various fastness properties and dischargeability.

7 Claims, No Drawings

REACTIVE RED MONOAZO DYE COMPOUND HAVING TWO VINYLSULFONE TYPE FIBER REACTIVE GROUPS

The present invention relates to a monoazo compound, a process for producing the same and a process for dyeing or printing fiber materials using the same. More specifically, the present invention relates to a monoazo compound having two vinylsulfone type fiber reactive groups a molecule, which is particularly useful for dyeing or printing fiber materials in a red color.

Many kinds of reactive dyes useful for dyeing or printing fiber materials in a red color are known. For example, U.S. Pat. No. 3,223,470 discloses a red reactive dye (monoazo compound) having both the vinylsulfone type fiber reactive group and a chlorotriazinyl fiber reactive group, which is represented by the following formula (A) in a free acid form.

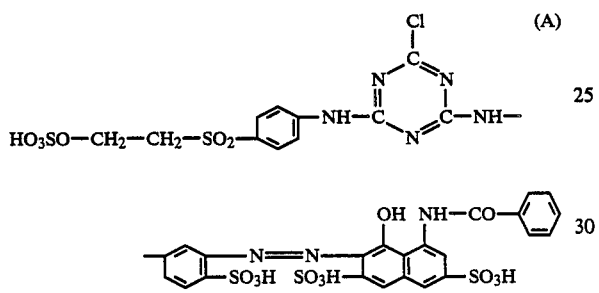

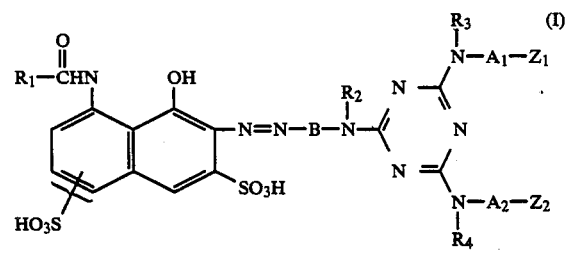

However, known red reactive dyes including the dye shown above are not yet sufficient to meet needs of high level for dye performances such as build-up property, solubility, robustness and dischargeability, and fastness properties of dyed products such as acid-hydrolysis fastness and chlorine fastness.

The present inventors have undertaken extensive studies to find a red reactive dye excellent in various dye performances including those described above, and as a result from a fact that a specific monoazo compound having two vinylsulfone type fiber reactive groups a molecule can meet such needs.

The present invention provides a monoazo compound represented by the following formula (I) in a free acid form,

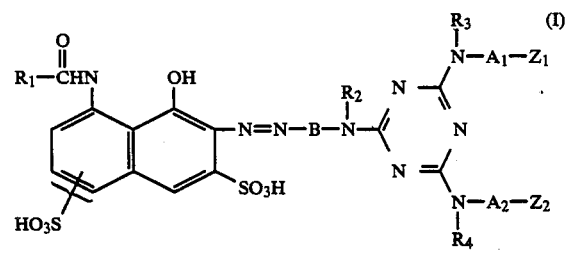

wherein $R_1$ is $C_{1\sim4}$ alkyl, $\beta$-carboxyethyl, $\beta$-carboxyvinyl or phenyl unsubstituted or substituted with $C_{1\sim4}$ alkyl, nitro, sulfo or halogeno, $R_2$, $R_3$ and $R_4$ independently of one another are each hydrogen or unsubstituted or substituted alkyl, $A_1$ and $A_2$ independently of one another are each an unsubstituted or substituted phenylene or naphthylene group, B is

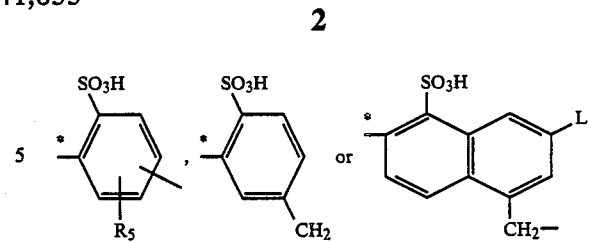

in which $R_5$ is hydrogen, methyl or sulfo, L is hydrogen or sulfo, and the asterisked linkage is bonded to the azo group, and $Z_1$ and $Z_2$ independently of one another are each $-SO_2CH=CH_2$ or $-SO_2CH_2CH_2Y$ in which Y is a group splittable by the action of an alkali, and a process for producing the monoazo compound of the above formula (I), which comprises using a cyanuric halide, an acylaminonaphthalene disulfonic acid represented by the following formula (II) in a free acid formula,

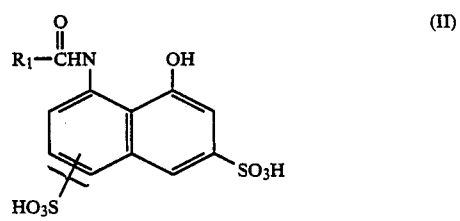

wherein $R_1$ is as defined above, an aromatic diamine compound represented by the following formula (III),

wherein B and $R_2$ are as defined above, an amine compound represented by the following formula (IV),

wherein $A_1$, $R_3$ and $Z_1$ are as defined above, and another amine compound represented by the following formula (V),

wherein $A_2$, $R_4$ and $Z_2$ are as defined above.

The present invention also provides a process for dyeing or printing fiber materials, which comprises using the monoazo compound of the above formula (I).

In the formula (I), the alkyl represented by $R_2$, $R_3$ and $R_4$ is preferably the one having 1 to 4 carbon atoms and unsubstituted or substituted with hydroxy, cyano, $C_1$-$C_4$ alkoxy, halogeno, carboxy, carbamoyl, $C_1$-$C_4$ alkoxycarbonyl, $C_1$-$C_4$ alkylcarbonyloxy, sulfo, sulfamoyl and the like. Examples of the alkyl are as those described in, for example, Published Unexamined Japanese Patent Application No. 122549/1984. Of those, preferred are methyl and ethyl. In the present invention, preferred is a case where $R_2$ is hydrogen, and any one of $R_3$ and $R_4$ is hydrogen.

The phenylene represented by $A_1$ and $A_2$ may be unsubstituted or substituted with one or two substituents. Examples of preferred substituents are methyl, ethyl, methoxy, ethoxy, chloro, bromo, carboxy and sulfo. The naphthylene represented by $A_1$ and $A_2$ may be unsubstituted or substituted with one sulfo. Preferred examples of these phenylene and naphthylene are as those described in Published Unexamined Japanese Patent Application No. 122549/1984. In the present invention, most preferred is the phenylene unsubstituted or substituted with one substituent.

The symbol Y in $-SO_2CH_2CH_2Y$ which is represented by $Z_1$ and $Z_2$ denotes a group capable of being split by the action of an alkali and includes different groups known per se such as sulfuric acid ester group, thiosulfuric acid ester group, phosphoric acid ester group, acetic acid ester group and halogen atoms (e.g. chlorine). Of these groups represented by $Z_1$ and $Z_2$, particularly preferred is a $\beta$-sulfatoethylsulfonyl group ($-SO_2CH_2CH_2OSO_3H$), which may be incorporated with a vinylsulfonyl group ($-SO_2CH=CH_2$). In the present invention, the most preferred is a case where both $Z_1$ and $Z_2$ denote the $\beta$-sulfatoethylsulfonyl group.

Preferred examples of the substituent $R_1$ are methyl, ethyl, n- or iso-propyl, $\beta$-carboxyethyl, $\beta$-carboxyvinyl, phenyl, 2-, 3- or 4-methylphenyl, 2-, 3- or 4-nitrophenyl, 2-, 3- or 4-sulfophenyl and 2-, 3- or 4-chlorophenyl.

Among the monoazo compounds of the formula (I), preferred are those represented by the following formulas (I-1) and (I-2), each in a free acid form,

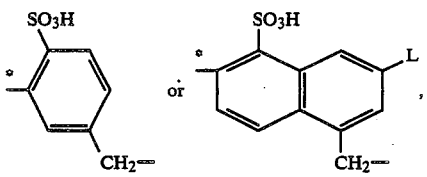

wherein the asterisked linkage and L are as defined above.

The monoazo compound of the formula (I) can be produced by using as starting materials a cyanuric halide such as cyanuric chloride, the acylaminonaphthalene disulfonic acid of the formula (II), the aromatic diamine compound of the formula (III), the amine compound of the formula (IV) and another amine compound of the formula (V), wherein the acylaminonaphthalene disulfonic acid (II) and the aromatic diamine compound (III) are used as a coupling component and a diazo component, respectively, and the remaining materials are used for the condensation reaction.

The monoazo compound (I) can be produced, for example, in the following manner.

The aromatic diamine compound (III) is diazotized in a manner known per se, followed by coupling with the acylaminonaphthalene disulfonic acid (II) also in a manner known per se, thereby obtaining a monoazo inter-

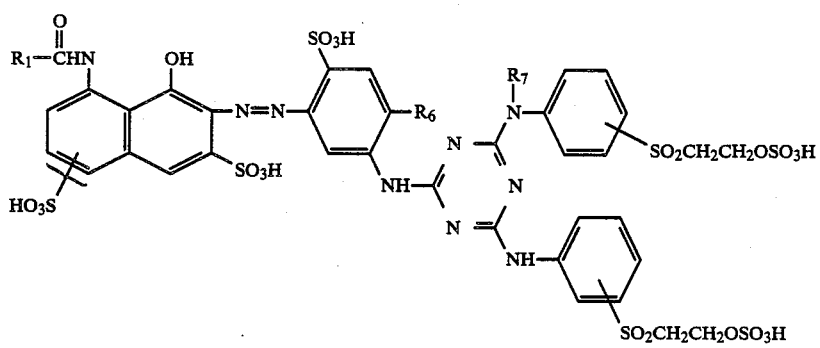

wherein $R_6$ is hydrogen or sulfo, $R_7$ is hydrogen, methyl or ethyl, and $R_1$ is as defined above, and mediate compound. Successively, any one of the monoazo intermediate compound, the amine compound (IV)

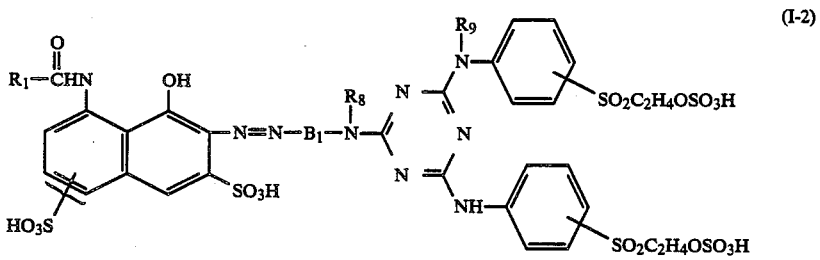

wherein $R_8$ and $R_9$ independently of one another are each hydrogen, methyl or ethyl, $B_1$ is and another amine compound (V) is subjected to first condensation reaction with the cyanuric halide, followed by second and third condensation reactions using the remainders. In this manner, the order of condensation is not particularly limited. However, considering the yield and quality of the monoazo compound (I) to be obtained, it is preferred to use any one of the monoazo intermediate and the starting materials (IV) and (V) having the lowest reactivity to the cyanuric halide first of all. A first condensation of any one of the monoazo intermediate and the starting materials (IV) and (V) with the cyanuric halide can be carried out in an aqueous medium at a temperature of −10° to 50° C., preferably 0° to 30° C., while controlling the pH within 1 to 10, preferably 2 to 7. A second condensation of any one of remaining two with the first condensate can be carried out in an aqueous medium at a temperature of 10° to 80° C., preferably 20° to 50° C., while controlling the pH within 2 to 9, preferably 3 to 6, and a third condensation of the last one with the second condensate in an aqueous medium at a temperature of 40° to 100° C., preferably 40° to 80° C., while controlling the pH within 2 to 9, preferably 3 to 6.

The aromatic diamine compound of the formula (III) includes, for example, 2,4-diaminobenzenesulfonic acid, 2,5-diaminobenzenesulfonic acid, 2,4-diaminiobenzene-1,5-disulfonic acid, 2,5-diaminobenzene-1,4-disulfonic acid, 2,4-diamino-5-methylbenzenesulfonic acid, 2-amino-4-aminomethylbenzene-1-sulfonic acid, 2-amino-5-aminomethylnaphthalene-1-sulfonic acid, 2-amino-5-aminomethylnaphthalene-1,7-disulfonic acid and their N-methyl or ethylamino compounds. Of these, preferred are 2,4-diaminobenzenesulfonic acid, 2,4-diaminoenzene-1,5-disulfonic acid, 2-amino-4-aminomethylbenzene-1-sulfonic acid, 2-amino-5-aminomethylnaphthalene-1-sulfonic acid and 2-amino-5-aminomethylnaphthalene-1-sulfonic acid and 2-amino-5-aminomethylnapthalene-1,7-disulfonic acid.

All the starting compounds described above may be used in the form of a free acid or a salt such as alkali metal and alkaline earth metal salts.

The monoazo compound of the formula (I) may be in the form of a free acid, preferably in the form of an alkali metal or akaline earth metal salt such as sodium salt, potassium salt and the like.

After completion of the reaction, the desired monoazo compound (I) containing reaction mixture may be subjected to salting-out in a conventional manner using an electrolyte, demineralization using a semipermeable membrane, evaporation such as spray-drying and the like to provide the monoazo compound (I) in the form of a powdery or liquid commercial product.

The monoazo compound (I) of the present invention is fiber-reactive and useful for dyeing or printing hydroxyl group-containing and amide group-containing materials in a fibrous form including unmixed or mixed fiber spinning.

The hydroxyl group-containing materials include natural or syntheric hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present monoazo compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt usable for promoting the exhaustion may be added to a dye bath before or after temperature reaching a desired level for the dyeing, if desired, dividedly.

The padding can be carried out by padding the fiber materials at ambient temperature or an elevated temperature, and after drying, steaming of dry-heating the materials to perform the dye-fixation.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides are alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminonaphthalenesulfonic acid, or an addition product between stearylamine and ethylene oxide, and the like.

The present monoazo compound (I) can be characterized by excellent dye performances in the dyeing and printing of fiber materials, particularly cellulose fiber materials. For example, the compound can give a dyed product excellent in light fastness, perspiration-light fastness, formalin fastness, wet fastness such as washing resistance, peroxide-washing resistance, chlorine resistance, chlorine bleaching resistance, perspiration resistance and acid-hydrolysis resistance, and alkali fastness, abrasion fastness and iron fastness. The monoazo compound (I) can also exhibit extremely excellent build-up, level-dyeing and wash-off properties and high solubility as well as high exhaustion and fixation percentages and excellent dischargeability. Moreover, when used for the dyeing or printing, the monoazo compound (I) is robust so that a shade to be obtained can hardly be affected by changes in dyebath conditions such as a dyeing temperature, a pH, an amount of inorganic salts ad a bath ratio, and thus a dyed or printed product with a constant quality can be obtained with superior reproducibility.

Further, particularly when applied for the dyeing by the cold batch-up dyeing method, the monoazo compound (I) can exhibit excellent build-up property and alkali stability (almost no hydrolysis by the action of the alkali agent) and almost no difference in the depth and shade appears between the dyed products obtained by fixing at 25° C. and at a lower temperature than that.

The present invention is illustrated in more detail with reference to the following Examples which are only illustrative, but not limitative. In Examples, all parts and % are by weight.

EXAMPLE 1

2,4-Diaminobenzenesulfonic acid (18.8 parts) and cyanuric chloride (18.5 parts) were added in water (400 parts), and the mixture was allowed to react with each other at 0° to 5° C. within a pH of 2 to 3, thereby completing a first condensation.

1-Aminobenzene-4-β-sulfatoethylsulfone (28.1 parts) was added to the above first condensation reaction mixture, and the mixture was allowed to react at 5° to 15° C. within a pH of 4 to 5, thereby completing a second condensation. Successively, the second condensate was diazotized in a conventional manner.

To the diazonium salt containing mixture was added 1-propionylamino-8-hydroxynaphthalene-3,6-disulfinic acid (37.5 parts), and the mixture was allowed to react at 0° to 5° C. within a pH of 5 to 7, thereby completing a coupling reaction.

Successively, 1-aminobenzene-3-β-sulfatoethylsulfone (28.1 parts) was added thereto, and the mixture was allowed to react at 60° to 70° C. within a pH of 4 to 5, thereby completing a third condensation. Salting-out of the reaction mixture followed by filtration, washing and drying gave a monoazo compound represented by the following formula in a free acid form.

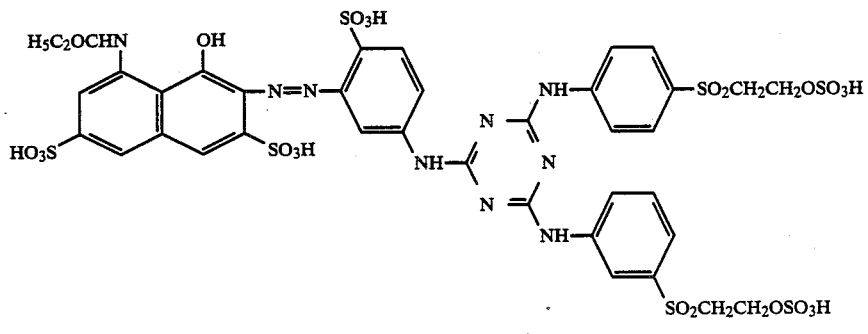

(λmax 540 nm)

EXAMPLE 2

Example 1 was repeated, provided that 1-propionylamino-8-hydroxynaphthalene-3,6-disulfonic acid, 2,4-diaminobenzenesulfonic acid, 1-aminobenzene-4-β-sulfatoethylsulfone and 1-aminobenzene-3-β-sulfatoethylsulfone used in Example 1 were replaced by the acylaminonaphthalene disulfonic acid of the formula (II) as shown in a column A of the following table, the aromatic diamine compound of the formula (III) as shown in a column B thereof, the amine compound of the formula (IV) as shown in a column C thereof and another amine compound of the formula (V) as shown in a column D thereof, respectively, to obtain the corresponding monoazo compound characterized by the shade of dyed product as shown in a column E thereof.

| Run No. | A Compound of the formula (II) | B Compound of the formula (III) | C Compound of the formula (IV) | D Compound of the formula (V) | E Shade |
|---|---|---|---|---|---|
| 1 | 1-Propionylamino-8-hydroxynaphthalene-3,6-disulfonic acid | 2,4-Diaminobenzenesulfonic acid | 1-Aminobenzene-3-β-sulfatoethylsulfone | 1-Aminobenzene-3-β-sulfatoethylsulfone | Red |
| 2 | 1-Propionylamino-8-hydroxynaphthalene-3,6-disulfonic acid | 2,4-Diaminobenzenesulfonic acid | 1-Aminobenzene-3-vinylsulfone | 1-Aminobenzene-3-β-sulfatoethylsulfone | Red |
| 3 | 1-Propionylamino-8-hydroxynaphthalene-3,6-disulfonic acid | 2,4-Diaminobenzenesulfonic acid | N—Ethylaniline 4-β-sulfatoethylsulfone | 1-Aminobenzene-3-β-sulfatoethylsulfone | Red |
| 4 | 1-Propionylamino-8-hydroxynaphthalene-3,6-disulfonic acid | 2,4-Diaminobenzenesulfonic acid | N—Cyanoethylaniline-3-β-phosphatoethylsulfone | 1-Aminobenzene-3-β-sulfatoethylsulfone | Red |
| 5 | 1-Propionylamino-8-hydroxynaphthalene-3,6- | 2,4-Diaminobenzenesulfonic acid | 1-Amino-2-methoxybenzene-5-β-sulfatoethyl- | 1-Aminobenzene-3-β-sulfatoethylsulfone | Red |

-continued

| Run No. | A Compound of the formula (II) | B Compound of the formula (III) | C Compound of the formula (IV) | D Compound of the formula (V) | E Shade |
|---|---|---|---|---|---|
| | disulfonic acid | | sulfone | | |
| 6 | 1-Propionylamino-8-hydroxynaphthalene-3,6-disulfonic acid | 2,4-Diaminobenzenesulfonic acid | 2-Amino-6-sulfonaphthalene-8-β-sulfatoethylsulfone | 1-Aminobenzene-3-β-sulfatoethylsulfone | Red |
| 7 | 1-Propionylamino-8-hydroxynaphthalene-3,6-disulfonic acid | 2,5-Diaminobenzenesulfonic acid | 2-Amino-1-sulfonaphthalene-6-β-sulfatoethylsulfone | 1-Aminobenzene-3-β-sulfatoethylsulfone | Bluish red |
| 8 | 1-Propionylamino-8-hydroxynaphthalene-3,6-disulfonic acid | 2,4-Diaminobenzenesulfonic acid | 2-Amino-1-sulfonaphthalene-6-β-sulfatoethylsulfone | 1-Aminobenzene-3-β-sulfatoethylsulfone | Red |
| 9 | 1-Propionylamino-8-hydroxynaphthalene-4,6-disulfonic acid | 2,4-Diaminobenzenesulfonic acid | 1-Amino-2-methoxy-5-methylbenzene-4-β-sulfatoethylsulfone | 1-Aminobenzene-3-β-sulfatoethylsulfone | Yellowish red |
| 10 | 1-β-Carboxyethylcarbonylamino-8-hydroxynaphthalene-3,6-disulfonic acid | 2,4-Diaminobenzenesulfonic acid | 1-Amino-2-methoxy-5-methylbenzene-4-β-sulfatoethylsulfone | 1-Aminobenzene-3-β-sulfatoethylsulfone | Red |
| 11 | 1-β-Carboxyethylcarbonylamino-8-hydroxynaphthalene-3,6-disulfonic acid | 2,4-Diaminobenzenesulfonic acid | 1-Aminobenzene-3-β-sulfatoethylsulfone | 1-Aminobenzene-3-β-sulfatoethylsulfone | Red |
| 12 | 1-Acetylamino-8-hydroxynaphthalene-3,6-disulfonic acid | 2,4-Diamino-5-methylbenzenesulfonic acid | N—Ethylaniline 4-β-sulfatoethylsulfone | 1-Aminobenzene-3-β-sulfatoethylsulfone | Red |
| 13 | 1-β-Carboxyacryloylamino-8-hydroxynaphthalene-3,6-disulfonic acid | 2,4-Diaminobenzenesulfonic acid | 1-Aminobenzene-4-β-sulfatoethylsulfone | 1-Aminobenzene-4-β-sulfatoethyl fulfone | Red |
| 14 | 1-β-Carboxyacryloylamino-8-hydroxynaphthalene-3,6-disulfonic acid | 2,4-Diaminobenzenesulfonic acid | 1-Aminobenzene-3-β-sulfatoethylsulfone | 1-Aminobenzene-4-β-sulfatoethyl fulfone | Red |
| 15 | 1-Butyrylamino-8-hydroxynaphthalene-3,6-disulfonic acid | 2,4-Diaminobenzenesulfonic acid | 1-Aminobenzene-3-β-sulfatoethylsulfone | 1-Aminobenzene-4-β-sulfatoethyl fulfone | Red |
| 16 | 1-Butyrylamino-8-hydroxynaphthalene-3,6-disulfonic acid | 2,4-Diaminobenzenesulfonic acid | N—Propylaniline-3-β-sulfatoethylsulfone | 1-Aminobenzene-4-β-sulfatoethyl fulfone | Red |
| 17 | 1-Acetylamino-8-hydroxynaphthalene-3,6-disulfonic acid | 2,4-Diaminobenzene-1,5-disulfonic acid | 2-Aminonaphthalene-8-β-sulfatoethylsulfone | 1-Aminobenzene-4-β-sulfatoethyl fulfone | Red |
| 18 | 1-Butyrylamino-8-hydroxynaphthalene-4,6-disulfonic acid | 2,5-Diaminobenzenesulfonic acid | 1-Amino-4-methoxybenzene-3-β-sulfatoethylsulfone | 1-Aminobenzene-4-β-sulfatoethyl fulfone | Yellowish red |
| 19 | 1-Benzoylamino-8-hydroxynaphthalene-3,6-disulfonic acid | 2,4-Diaminobenzenesulfonic acid | N—Ethylaniline-3-β-sulfatoethylsulfone | 1-Aminobenzene-3-β-sulfatoethylsulfone | Bluish red |
| 20 | 1-Benzoylamino-8-hydroxynaphthalene-3,6-disulfonic acid | 2,4-Diaminobenzenesulfonic acid | 1-Aminobenzene-4-β-sulfatoethylsulfone | 1-Aminobenzene-3-β-sulfatoethylsulfone | Bluish red |
| 21 | 1-p-Methylbenzoylamino-8-hydroxynaphthalene-3,6-disulfonic acid | 2,4-Diaminobenzenesulfonic acid | 1-Aminobenzene-4-β-sulfatoethylsulfone | 1-Aminobenzene-3-β-sulfatoethylsulfone | Bluish red |
| 22 | 1-o-Sulfobenzoylamino-8-hydroxynaphthalene-3,6-disulfonic acid | 2,4-Diaminobenzenesulfonic acid | 1-Aminobenzene-4-β-sulfatoethylsulfone | 1-Aminobenzene-3-β-sulfatoethylsulfone | Bluish red |
| 23 | 1-m-Chlorobenzoylamino-8-hydroxynaphthalene-3,6- | 2,4-Diaminobenzenesulfonic acid | 1-Aminobenzene-4-β-sulfatoethylsulfone | 1-Aminobenzene-3-β-sulfatoethylsulfone | Bluish red |

-continued

| Run No. | A Compound of the formula (II) | B Compound of the formula (III) | C Compound of the formula (IV) | D Compound of the formula (V) | E Shade |
|---|---|---|---|---|---|
| | disulfonic acid | | | | |
| 24 | 1-m-Nitro-benzoylamino-8-hydroxynaphthalene-3,6-disulfonic acid | 2,4-Diaminobenzenesulfonic acid | 1-Aminobenzene-4-β-sulfatoethylsulfone | 1-Aminobenzene-3-β-sulfatoethylsulfone | Bluish red |
| 25 | 1-Propionylamino-8-hydroxynaphthalene-3,6-disulfonic acid | 2-Amino-4-N—methylamino-benzene-1-sulfonic acid | 1-Aminobenzene-4-β-sulfatoethylsulfone | 1-Aminobenzene-3-β-sulfatoethylsulfone | Red |
| 26 | 1-Propionylamino-8-hydroxynaphthalene-3,6-disulfonic acid | 2-Amino-4-N—ethylamino-benzene-1-sulfonic acid | 1-Aminobenzene-4-β-sulfatoethylsulfone | 1-Aminobenzene-3-β-sulfatoethylsulfone | Red |
| 27 | 1-Benzoylamino-8-hydroxynaphthalene-3,6-disulfonic acid | 2-Amino-4-N—ethylamino-benzene-1-sulfonic acid | 1-Aminobenzene-4-β-sulfatoethylsulfone | 1-Aminobenzene-3-β-sulfatoethylsulfone | Bluish red |
| 28 | 1-Benzoylamino-8-hydroxynaphthalene-3,6-disulfonic acid | 2-Amino-4-N—ethylamino-benzene-1-sulfonic acid | 1-Aminobenzene-3-β-sulfatoethylsulfone | 1-Aminobenzene-3-β-sulfatoethylsulfone | Bluish red |

EXAMPLE 3

2-Amino-5-aminomethylnaphthalene-1-sulfonic acid (25.2 parts) was diazotized in ice water in a conventional manner, and then an aqueous solution of 1-benzoylamino-8-hydroxynaphthalene-3,6-disulfonic acid (42.3 parts) was added dropwise to the above diazonium salt solution at 10° C., while controlling the pH within 7 to 8 using a 20% aqueous sodium carbonate solution, to complete the coupling reaction.

Successively, cyanuric chloride (18.5 parts) was added to the above monoazo intermediate containing mixture, and the resulting mixture was allowed to react at 20° to 30° C. with a pH of 8 to 9, thereby completing a first condensation. Thereafter, 1-aminobenzene-4-β-sulfatoethylsulfone (28.1 parts) was added to the first condensate containing mixture, and the resulting mixture was allowed to react at 30° to 40° C. within a pH of 4 to 5, thereby completing a second condensation.

1-Aminobenzene-3-β-sulfatoethylsulfone (28.1 parts) was added to the second condensate containing mixture and the resulting mixture was allowed to react at 60° to 70° C. within a pH of 4 to 5, thereby completing a third condensation. Salting-out of the reaction mixture followed by filtration, washing and drying gave a monoazo compound represented by the following formula in a free acid form.

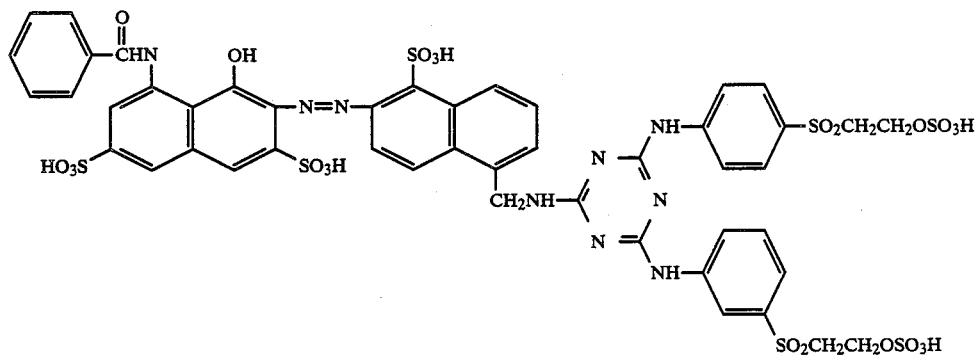

(λmax 560 nm)

EXAMPLE 4

Example 3 was repeated, provided that 1-benzolylamino-8-hydroxynaphthalene-3,6-disulfonic acid, 2-amino-5-aminomethylnaphthalene-1-sulfonic acid, 1-aminobenzene-4-β-sulfatoethylsulfone and 1-aminobenzene-3-β-sulfatoethylsulfone used in Example 3 were replaced by the acylaminonaphthalene disulfonic acid of the formula (II) as shown in a column A of the following table, the aromatic diamine compound of the formula (III) as shown in a column B thereof, the amine compound of the formula (IV) as shown in a column C thereof and another amine compound of the formula (V) as shown in a column D thereof, respectively, to obtain the corresponding monoazo compound characterized by the shade of dyed product as shown in a column E thereof.

| Run No. | A Compound of the formula (II) | B Compound of the formula (III) | C Compound of the formula (IV) | D Compound of the formula (V) | E Shade |
|---|---|---|---|---|---|
| 1 | 1-Benzoylamino-8-hydroxynaphthalene-3,6-disulfonic acid | 2-Amino-5-aminomethylnaphthalene-1,7-disulfonic acid | 1-Aminobenzene-3-β-sulfatoethylsulfone | 1-Aminobenzene-3-β-sulfatoethylsulfone | Bluish red |
| 2 | 1-Benzoylamino-8-hydroxynaphthalene-3,6-disulfonic acid | 2-Amino-4-aminomethylbenzene-1-sulfonic acid | 1-Aminobenzene-3-β-sulfatoethylsulfone | 1-Aminobenzene-3-β-sulfatoethylsulfone | Bluish red |
| 3 | 1-Benzoylamino-8-hydroxynaphthalene-3,6-disulfonic acid | 2-Amino-5-aminomethylnaphthalene-1-sulfonic acid | N—Ethylaniline-4-β-sulfatoethylsulfone | 1-Aminobenzene-3-β-sulfatoethylsulfone | Bluish red |
| 4 | 1-Benzoylamino-8-hydroxynaphthalene-4,6-disulfonic acid | 2-Amino-5-aminomethylnaphthalene-1-sulfonic acid | N—Ethylaniline-4-β-sulfatoethylsulfone | 1-Aminobenzene-3-β-sulfatoethylsulfone | Red |
| 5 | 1-Benzoylamino-8-hydroxynaphthalene-4,6-disulfonic acid | 2-Amino-5-aminomethylnaphthalene-1-sulfonic acid | 1-Aminobenzene-4-β-sulfatoethylsulfone | 1-Aminobenzene-3-β-sulfatoethylsulfone | Red |
| 6 | 1-Benzoylamino-8-hydroxynaphthalene-4,6-disulfonic acid | 2-Amino-4-N—methylaminomethylbenzene-1-sulfonic acid | N—Methylaniline-4-vinylsulfone | 1-Aminobenzene-3-β-sulfatoethyl- | Red |
| 7 | 1-Acetylamino-8-hydroxynaphthalene-3,6-disulfonic acid | 2-Amino-4-N—methylaminomethylbenzene-1-sulfonic acid | 1-Aminobenzene-3-β-sulfatoethylsulfone | 1-Aminobenzene-3-β-sulfatoethylsulfone | Bluish red |
| 8 | 1-Acetylamino-8-hydroxynaphthalene-3,6-disulfonic acid | 2-Amino-5-aminomethylnaphthalene-1,7-disulfonic acid | 1-Amino-2-methoxybenzene-5-β-sulfatoethylsulfone | 1-Aminobenzene-3-β-sulfatoethylsulfone | Bluish red |
| 9 | 1-Acetylamino-8-hydroxynaphthalene-3,6-disulfonic acid | 2-Amino-5-aminomethylnaphthalene-1-sulfonic acid | 2-Amino-6-sulfo naphthalene-8-β-sulfatoethylsulfone | 1-Aminobenzene-3-β-sulfatoethylsulfone | Bluish red |
| 10 | 1-Acetylamino-8-hydroxynaphthalene-3,6-disulfonic acid | 2-Amino-5-aminomethylnaphthalene-1-sulfonic acid | 1-Aminobenzene-4-β-sulfatoethylsulfone | 1-Aminobenzene-3-β-sulfatoethylsulfone | Bluish red |
| 11 | 1-Acetylamino-8-hydroxynaphthalene-4,6-disulfonic acid | 2-Amino-5-aminomethylnaphthalene-1-sulfonic acid | 1-Aminobenzene-4-β-sulfatoethylsulfone | 1-Aminobenzene-3-β-sulfatoethylsulfone | Bluish red |
| 12 | 1-Acetylamino-8-hydroxynaphthalene-4,6-disulfonic acid | 2-Amino-5-aminomethylnaphthalene-1-sulfonic acid | N—Cyanoethylaniline-3-β-phosphatoethylsulfone | 1-Aminobenzene-3-β-sulfatoethylsulfone | Bluish red |
| 13 | 1-Propionylamino-8-hydroxynaphthalene-3,6-disulfonic acid | 2-Amino-5-aminomethylnaphthalene-1-sulfonic acid | 1-Aminobenzene-3-β-sulfatoethylsulfone | 1-Aminobenzene-4-β-sulfatoethylsulfone | Bluish red |
| 14 | 1-Propionylamino-8-hydroxynaphthalene-3,6-disulfonic acid | 2-Amino-5-aminomethylnaphthalene-1-sulfonic acid | 2-Amino-1-sulfo-naphthalene-6-β-sulfatoethylsulfone | 1-Aminobenzene-4-β-sulfatoethylsulfone | Bluish red |
| 15 | 1-Propionylamino-8-hydroxynaphthalene-3,6-disulfonic acid | 2-Amino-5-aminomethylnaphthalene-1-sulfonic acid | 1-Amino-2-sulfo-benzene-5-β-sulfatoethylsulfone | 1-Aminobenzene-4-β-sulfatoethylsulfone | Bluish red |
| 16 | 1-Propionylamino-8-hydroxynaphthalene-3,6-disulfonic acid | 2-Amino-4-aminomethylbenzene-1-sulfonic acid | N—Methylaniline-3-β-sulfatoethylsulfone | 1-Aminobenzene-4-β-sulfatoethylsulfone | Bluish red |
| 17 | 1-Propionylamino-8-hydroxynaphthalene-3,6-disulfonic acid | 2-Amino-4-N—ethylaminomethylbenzene-1-sulfonic acid | 1-Amino-2-methoxy-5-methylbenzene-4-β-sulfatoethylsulfone | 1-Aminobenzene-4-β-sulfatoethylsulfone | Bluish red |
| 18 | 1-Propionylamino-8-hydroxynaphthalene-4,6-disulfonic acid | 2-Amino-5-aminomethylnaphthalene-1-sulfonic acid | 1-Aminobenzene-3-β-sulfatoethylsulfone | 1-Aminobenzene-4-β-sulfatoethylsulfone | Red |
| 19 | 1-Butyrylamino-8-hydroxynaphthalene-3,6-disulfonic acid | 2-Amino-5-aminomethylnaphthalene-1-sulfonic acid | 1-Aminobenzene-3-β-sulfatoethylsulfone | 1-Aminobenzene-3-β-sulfatoethyl sulfone | Bluish red |
| 20 | 1-Butyrylamino- | 2-Amino-5- | 1-Aminobenzene- | 1-Aminobenzene- | Red |

-continued

| Run No. | A<br>Compound of the formula (II) | B<br>Compound of the formula (III) | C<br>Compound of the formula (IV) | D<br>Compound of the formula (V) | E<br>Shade |
|---|---|---|---|---|---|
| | 8-hydroxynaphthalene-4,6-disulfonic acid | aminomethylnaphthalene-1-sulfonic acid | 3-$\beta$-sulfatoethylsulfone | 3-$\beta$-sulfatoethyl sulfone | |
| 21 | 1-$\beta$-Carboxyethylcarbonylamino-8-hydroxynaphthalene-3,6-disulfonic acid | 2-Amino-5-aminomethylnaphthalene-1-sulfonic acid | 1-Aminobenzene-3-$\beta$-sulfatoethylsulfone | 1-Aminobenzene-3-$\beta$-sulfatoethyl sulfone | Bluish red |
| 22 | 1-$\beta$-Carboxyethylcarbonylamino-8-hydroxynaphthalene-3,6-disulfonic acid | 2-Amino-5-aminomethylnaphthalene-1,7-disulfonic acid | N—Hydroxyethylaniline-4-$\beta$-chloroethylsulfone | 1-Aminobenzene-3-$\beta$-sulfatoethyl sulfone | Bluish red |
| 23 | 1-$\beta$-Carboxyethylcarbonylamino-8-hydroxynaphthalene-3,6-disulfonic acid | 1-Amino-5-N—methyl-aminomethylbenzene-2-sulfonic acid | N—Ethylaniline-3-$\beta$-sulfatoethylsulfone | 1-Aminobenzene-3-$\beta$-sulfatoethyl sulfone | Bluish red |
| 24 | 1-$\beta$-Carboxyethylcarbonylamino-8-hydroxynaphthalene-4,6-disulfonic acid | 1-Amino-5-N—methyl-aminomethylbenzene-2-sulfonic acid | N—Ethylaniline-3-$\beta$-sulfatoethylsulfone | 1-Aminobenzene-3-$\beta$-sulfatoethyl sulfone | Red |
| 25 | 1-$\beta$-carboxyacryloylamino-8-hydroxynaphthalene-3,6-disulfonic acid | 2-Amino-5-aminomethylnaphthalene-1-sulfonic acid | 1-Aminobenzene-4-$\beta$-sulfatoethylsulfone | 1-Aminobenzene-3-$\beta$-sulfatoethyl sulfone | Bluish red |
| 26 | 1-$\beta$-carboxyacryloylamino-8-hydroxynaphthalene-3,6-disulfonic acid | 2-Amino-5-aminomethylnaphthalene-1-sulfonic acid | 1-Amino-2-ethoxybenzene-5-$\beta$-sulfatoethylsulfone | 1-Aminobenzene-3-$\beta$-sulfatoethyl sulfone | Bluish red |
| 27 | 1-p-Methylbenzoylamino-8-hydroxynaphthalene-3,6-disulfonic acid | 2-Amino-5-aminomethylnaphthalene-1-sulfonic acid | 1-Amino-2-chlorobenzene-4-$\beta$-sulfatoethylsulfone | 1-Aminobenzene-3-$\beta$-sulfatoethyl sulfone | Bluish red |
| 28 | 1-o-Sulfobenzoylamino-8-hydroxynaphthalene-3,6-disulfonic acid | 2-Amino-5-aminomethylnaphthalene-1-sulfonic acid | 1-Aminobenzene-3-$\beta$-sulfatoethylsulfone | 1-Aminobenzene-3-$\beta$-sulfatoethyl sulfone | Bluish red |
| 29 | 1-m-Chlorobenzoylamino-8-hydroxynaphthalene-3,6-disulfonic acid | 2-Amino-5-aminomethylnaphthalene-1-sulfonic acid | 1-Aminobenzene-3-$\beta$-sulfatoethylsulfone | 1-Aminobenzene-3-$\beta$-sulfatoethyl sulfone | Bluish red |
| 30 | 1-m-Nitrobenzoylamino-8-hydroxynaphthalene-3,6-disulfonic acid | 2-Amino-5-aminomethylnaphthalene-1-sulfonic acid | 1-Aminobenzene-3-$\beta$-sulfatoethylsulfone | 1-Aminobenzene-3-$\beta$-sulfatoethyl sulfone | Bluish red |

Dyeing Example 1

Each of the monoazo compounds obtained in Examples 1 to 4 (0.3 part) was dissolved in water (200 parts), and sodium sulfate (10 parts) and cotton (10 parts) were added thereto in this order. The bath was heated to 60° C. 20 Minutes thereafter, sodium carbonate (4 parts) was added thereto, and dyeing was continued for 1 hour at that temperature. Thereafter, the cotton was taken out, washed with water and soaped to obtain each dyed product of a very deep color excellent in fastness properties.

The above dyeing procedure was repeated, provided that the dyeing temperature, the bath ratio and the amount of inorganic salt were changed respectively to some extent, even whereby each dyed product having a quality similar to that of the above was obtained with good reproducibility.

Dyeing Example 2

| Composition of color paste | |
|---|---|
| Each of the monoazo compounds obtained in Examples 1 to 4 | 5 parts |
| Urea | 5 parts |
| Sodium alginate (5%), thickener | 50 parts |
| Hot water | 25 parts |
| Sodium hydrogencarbonate | 2 parts |
| Balance (water) | 13 parts |

Mercerized cotton broad cloth was printed with the color paste having the composition described above, and then pre-dried, subjected to steaming at 100° C. for 5 minutes, rinsed with hot water, soaped, again rinsed with hot water, and then dried. Thus there was obtained each printed product of a deep color excellent in various fastness properties.

Dyeing Example 3

The monoazo compounds obtained in Examples 1 to 4 each (25 parts) was dissolved in hot water, and the solution was cooled to 25° C. To this solution were added 32.5% aqueous sodium hydroxide solution (5.5 parts) and 50°Be' water glass (150 parts), and then water was added thereto to make the whole 1000 parts at 25° C. Immediately thereafter, cotton cloth was padded with the obtained padding liquor. The cloth padded was batched-up, wrapped tightly with a polyethylene film, and allowed to stand in a room kept at 20° C.

The above manner was repeated to obtain the cloth padded, which was then batched-up, wrapped with a polyethylene film and then allowed to stand in a room kept at 5° C.

Both were allowed to stand for 20 hours, and thereafter washed with cool water and then hot water, soaped with a boiling detergent, then washed with cool water and dried to obtain each dyed product.

There was observed almost no difference in color shade and depth between the dyed products obtained after standing at 5° C. and 20° C. each for 20 hours. It was also found that each build-up property was excellent.

What is claimed is:

1. A monoazo compound represented by the following formula in a free acid form,

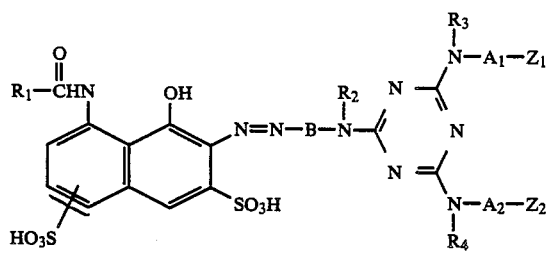

wherein $R_1$ is $C_{1-4}$ alkyl, β-carboxyethyl, β-carboxyvinyl or phenyl unsubstituted or substituted with $C_{1-4}$ alkyl, nitro, sulfo, or halogeno, $R_2$, $R_3$ and $R_4$ independently of one another are each hydrogen or alkyl, unsubstituted or substituted with hydroxy, cyano, $C_1$-$C_4$ alkoxy, halogeno, carboxy, carbamoyl, $C_1$-$C_4$ alkoxycarbonyl, $C_1$-$C_4$ alkylcarbonyloxy, sulfo or sulfamoyl, $A_1$ and $A_2$ independently of one another are each an unsubstituted or substituted phenylene or naphthylene group, B is

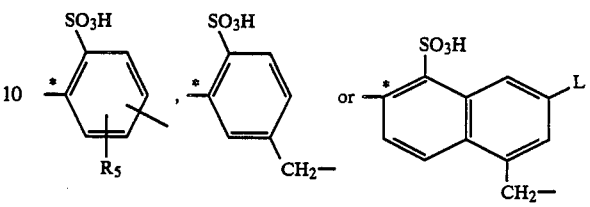

in which $R_5$ is hydrogen, methyl or sulfo, L is hydrogen or sulfo, and the asterisked linkage is bonded to the azo group, and $Z_1$ and $Z_2$ independently of one another are each $-SO_2CH=CH_2$ or $-SO_2CH_2CH_2Y$ in which Y is a group splittable by the action of an alkali.

2. A monoazo compound according to claim 1, wherein $R_1$ is methyl, ethyl, n- or iso-propyl, β-carboxyethyl, β-carboxyvinyl, phenyl, 2-, 3- or 4-metylphenyl, 2-, 3- or 4-nitrophenyl, 2-, 3- or 4-sulfophenyl or 2-, 3- or 4-chlorophenyl.

3. A monoazo compound according to claim 1, wherein $R_2$, $R_3$ and $R_4$ independently of one another are each hydrogen, methyl or ethyl.

4. A monoazo compound according to claim 1, wherein $A_1$ and $A_2$ independently of one another are each phenylene unsubstituted or substituted with one or two members selected from methyl, ethyl, methoxy, ethoxy, chloro, bromo, carboxy and sulfo, or naphthylene unsubstituted or substituted with sulfo.

5. A monoazo compound according to claim 1, wherein both $Z_1$ and $Z_2$ are β-sulfatoethylsulfonyl.

6. The monoazo compound represented by the following formula in a free acid form,

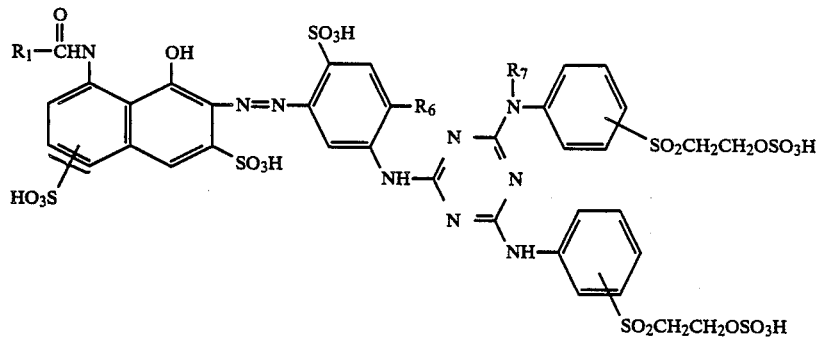

wherein $R_1$ is $C_{1-4}$ alkyl, β-carboxyethyl, β-carboxyvinyl or phenyl unsubstituted or substituted with $C_{1-4}$ alkyl, nitro, sulfo or halogeno, $R_6$ is hydrogen or sulfo, and $R_7$ is hydrogen, methyl or ethyl.

7. A monoazo compound represented by the following formula in a free acid form,

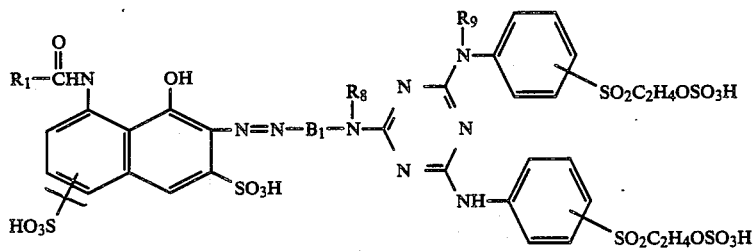
wherein $R_1$ is $C_{1-4}$ alkyl, β-carboxyethyl, β-carboxyvinyl or phenyl unsubstituted or substituted with $C_{1-4}$ alkyl, nitro, sulfo or halogeno, $R_8$ and $R_9$ independently of one another are each hydrogen, methyl or ethyl, and $B_1$ is
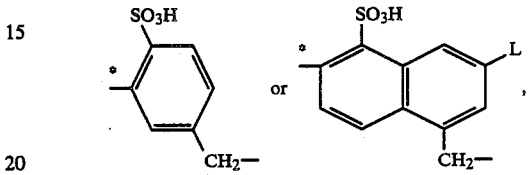
in which L is hydrogen or sulfo and the asterisked linkage is bonded to the azo group.
* * * * *